(12) United States Patent
Boyd et al.

(10) Patent No.: US 6,278,520 B1
(45) Date of Patent: Aug. 21, 2001

(54) METHOD AND DEVICE FOR MEASURING PARTS

(75) Inventors: Scott Boyd, Union; Kenneth Daniel Krabacher, Dayton, both of OH (US)

(73) Assignee: Beta Laser Mike, Inc., Dayton, OH (US)

( * ) Notice: Subject to any disclaimer, the term of this patent is extended or adjusted under 35 U.S.C. 154(b) by 0 days.

(21) Appl. No.: 09/373,964

(22) Filed: Aug. 13, 1999

(51) Int. Cl.$^7$ .................................................. G01B 11/02
(52) U.S. Cl. ............................ 356/387; 356/386; 33/550
(58) Field of Search .................................. 356/384, 385, 356/386, 387, 429; 33/555.1, 555.3, DIG. 3, DIG. 21

(56) References Cited

U.S. PATENT DOCUMENTS

| | | | | |
|---|---|---|---|---|
| 4,213,707 | * | 7/1980 | Evans, Jr. ............................ | 356/387 |
| 4,492,473 | * | 1/1985 | Richter et al. ........................ | 356/386 |
| 4,884,605 | * | 12/1989 | Ely ........................................ | 356/385 |
| 4,991,308 | * | 2/1991 | Donaldson ........................... | 33/555.1 |
| 5,113,591 | * | 5/1992 | Connelly .............................. | 356/387 |
| 5,175,595 | * | 12/1992 | Fukase .................................. | 356/387 |
| 5,311,291 | * | 5/1994 | Cholet .................................. | 356/386 |

\* cited by examiner

*Primary Examiner*—Hoa Q. Pham
(74) *Attorney, Agent, or Firm*—R. William Graham

(57) ABSTRACT

A method and device are provided for disposing a part of a generally cylindrical work piece in a path of a laser beam such that a first portion of the beam passes by one side of the work piece, positioning a laser beam receiving processor in a manner to receive the first portion of the laser beam in order to enable a determination a size of the part, disposing another part of the generally cylindrical work piece in a generally V-shaped seat such that the work piece contacts two sides of the V-shaped seat, and applying sufficient force on the second part in a manner to cause slidable rotation of the work piece in the V-shaped seat while maintaining contact with the two sides.

18 Claims, 16 Drawing Sheets

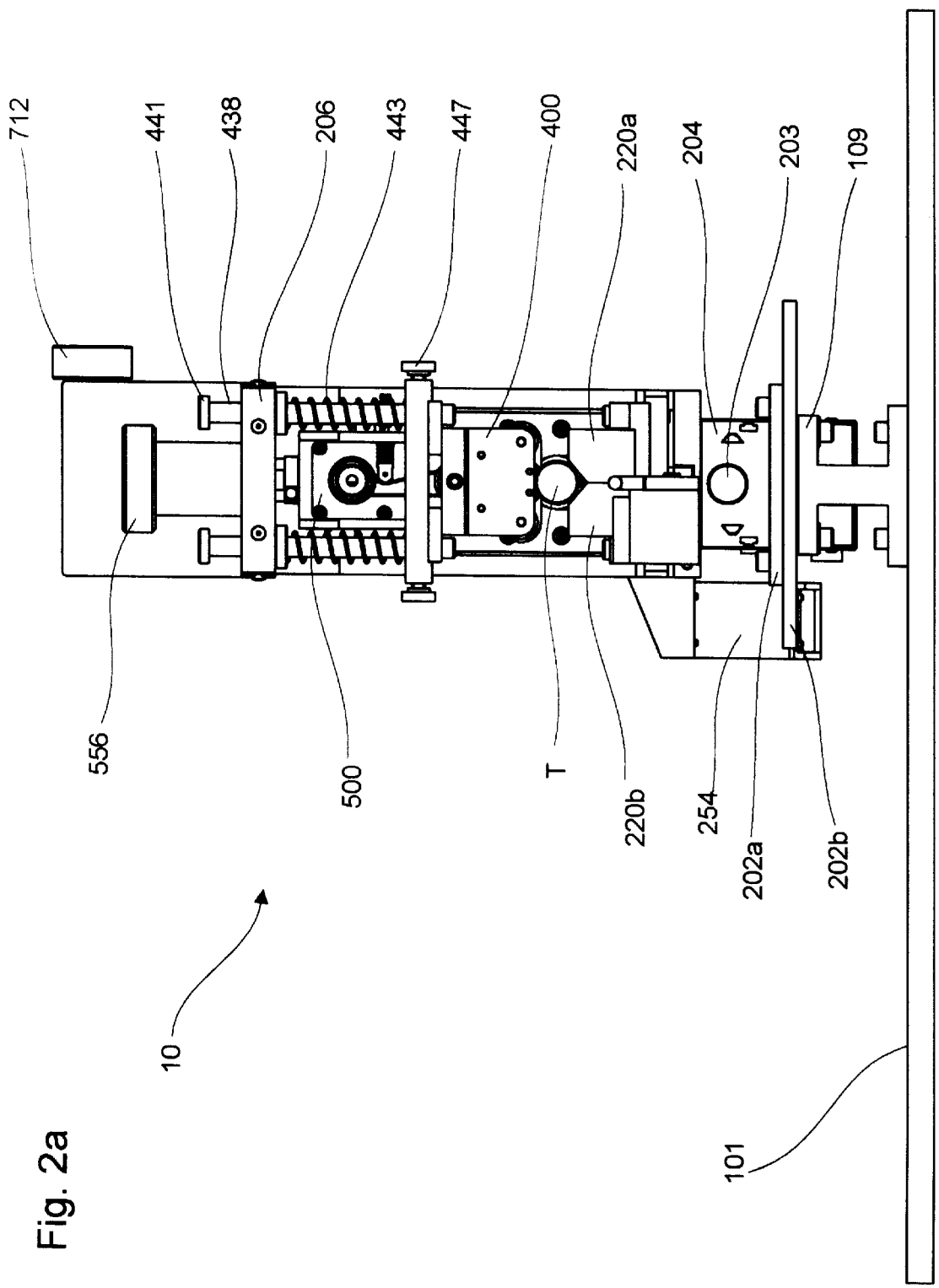

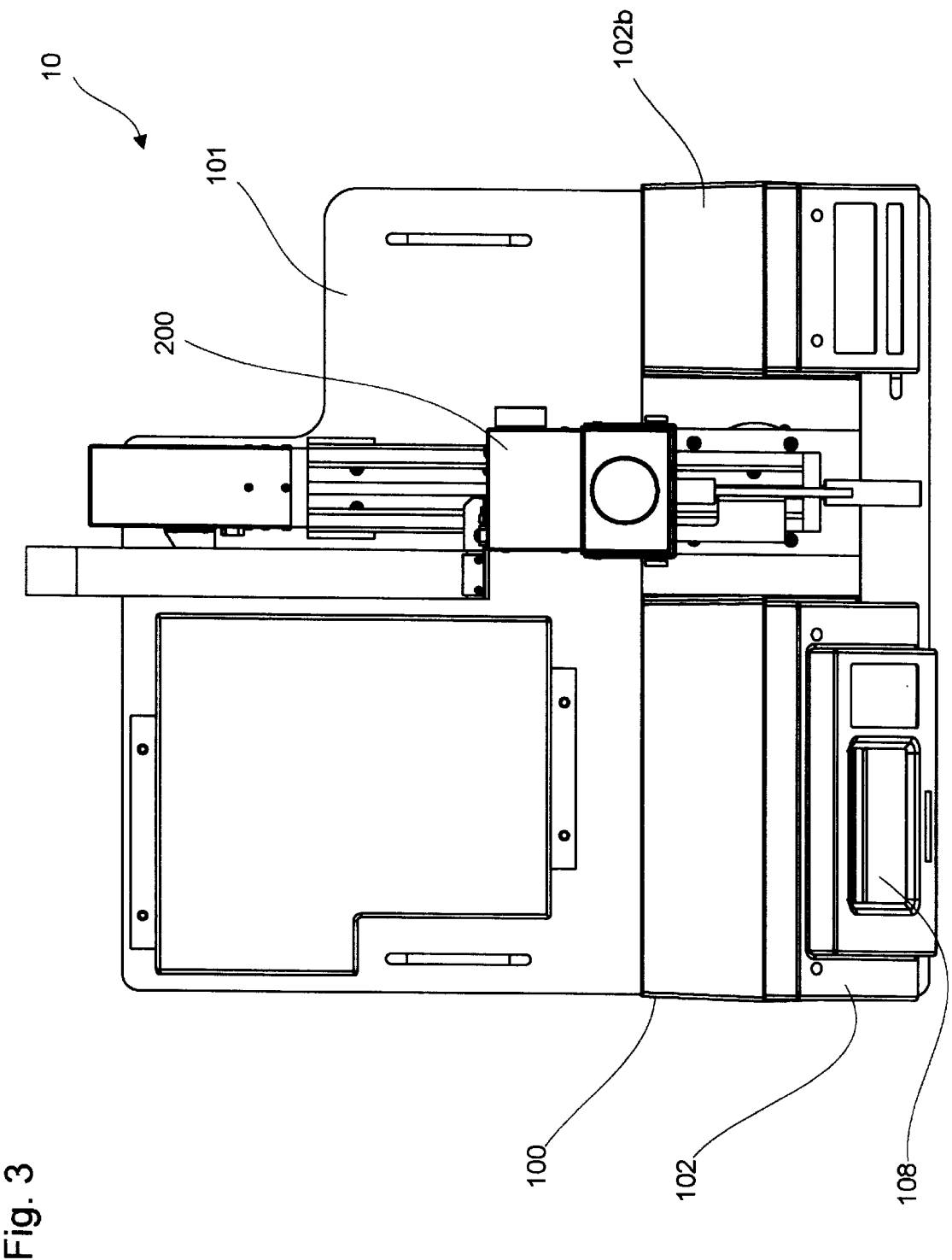

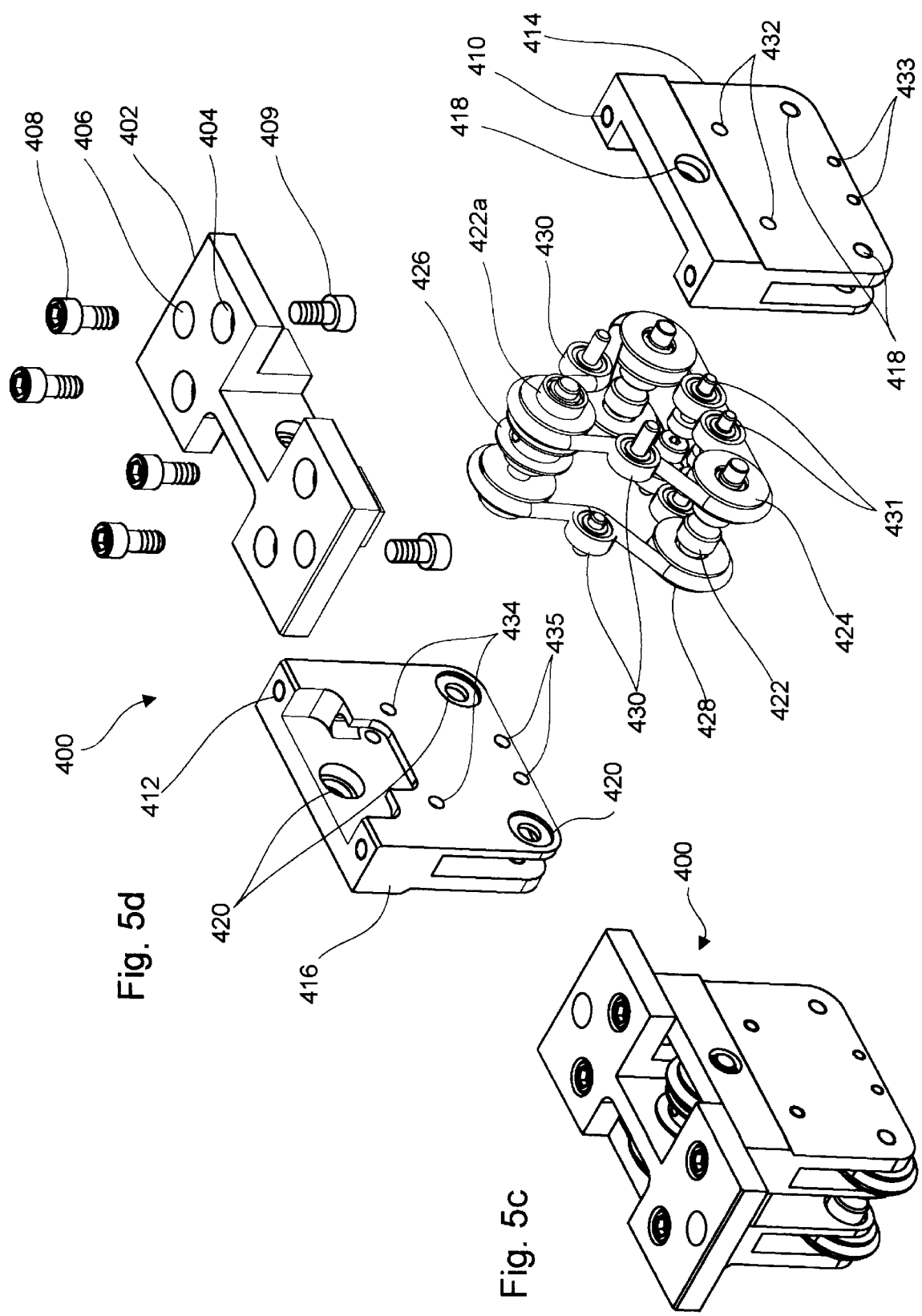

METHOD AND DEVICE FOR MEASURING PARTS

BACKGROUND OF THE INVENTION

1. Field of the Invention

The present invention relates to measuring devices, particularly, micrometers. Specifically, the micrometer of the present invention includes a novel fixture as well as method and processor for determining the maximum diameter of a work piece along the length of the work piece.

2. Related Art

There exists numerous micrometers, gauges and instruments and methods for measuring parts. The ability gain an accurate measurement of the part is a function of the limitations of the method and device as well as the particular characteristics of the part to be measured. For example, parts can be hard, soft, radioactive, delicate, sterile, brittle, etc. In the case of parts which cannot be handled in the area of measurement in order to obtain accuracy, non-contact gauging methods and devices have been employed.

One technique which has been employed to obtain accurate measurements in non-contact environments is to employ a laser transmitter, receiver, and processor. The laser transmitter passes beam of light wider than the object to be measured and a receiver detects the portion of the beam which passes about the object. The portion of the beam which does not pass to the receiver generally represents the size of the object. The received beam is manipulated by the processor to provide a readout of the size of the object.

While this type of measuring device and method has proved to be very useful, there remains a need to improve the technology. For example, the existing techniques do not provide for accurate measurement where high degree of tolerances are required. The object's circumference often varies in size and depending on its position in which it is placed in the path of the beam, e.g., a cylindrical piece will vary in its circumference as it is rotated.

Thus, there is a need to provide a quick and reliable method and device for accurately ascertaining the size of objects. The present invention provides such a device and method.

BRIEF SUMMARY OF THE INVENTION

It is an object to improve measuring techniques.

It is a further object to improve upon the devices for measuring.

It is another object to improve upon laser micrometer devices and measuring techniques using the same.

Accordingly, one embodiment of the present invention is directed to a method of measuring a part, such as tubing, pipe, hose, cable, for example. The method includes the steps of (a) disposing a first part of a generally cylindrical work piece in a path of a laser beam such that a first portion of the beam passes by one side of the work piece;

(b) positioning a laser beam receiving processor in a manner to receive the first portion of the laser beam in order to enable a determination a size of the first part;

(c) disposing a second part of the generally cylindrical work piece in a generally V-shaped seat such that the work piece contacts two sides of the V-shaped seat; and (d) applying sufficient force on the second part in a manner to cause slidable rotation of the work piece in the V-shaped seat while maintaining contact with the two sides. The method further characterizes the step of (a) as disposing the first part in the laser beam such that a second portion of the laser beam passes by another side of the work piece.

The method further characterizes the step (b) to position the laser beam receiving processor in a manner to receive the second portion of the laser beam in order to enable a determination a size of the first part, wherein the size is determined as a function of distance between first portion and the second portion of laser beam. The method may also be characterized as having a known laser beam scan width and performing a plurality of size determinations as the work piece is rotated to determine the maximum and minimum size of the first part. The method further includes disposing the work piece perpendicular to a path of the laser beam. The method may also include passing the laser beam axially across the work piece.

In another embodiment, the invention is directed to a fixture for use with a laser micrometer. The fixture includes a V-shaped seat having a first side surface and a second side surface, wherein the surfaces form a seat to receive a generally cylindrical work piece, and apparatus for rotating the work piece in a manner to cause slidable rotation of the work piece in the V-shaped seat while maintaining contact with the two sides.

Still another embodiment includes a laser micrometer for generating a laser beam path such that a first portion of the beam passes by one side of a work piece, and a laser beam receiving processor in a manner to receive the first portion of the laser beam in order to enable a determination a size of the first part. The laser micrometer includes the V-shaped fixture operably connected thereto.

Other objects and advantages will be readily apparent to those skilled in the art upon viewing the drawings and reading the detailed description hereafter.

BRIEF DESCRIPTION OF THE DRAWINGS

FIG. 2a is another side front view of a part of the present invention.

FIG. 3 is a top view of the present invention.

FIG. 5c is a perspective view of a drive assembly of the present invention.

FIG. 5d is an exploded perspective view of the drive assembly of the present invention.

DETAILED DESCRIPTION OF THE INVENTION

Figure 1A:
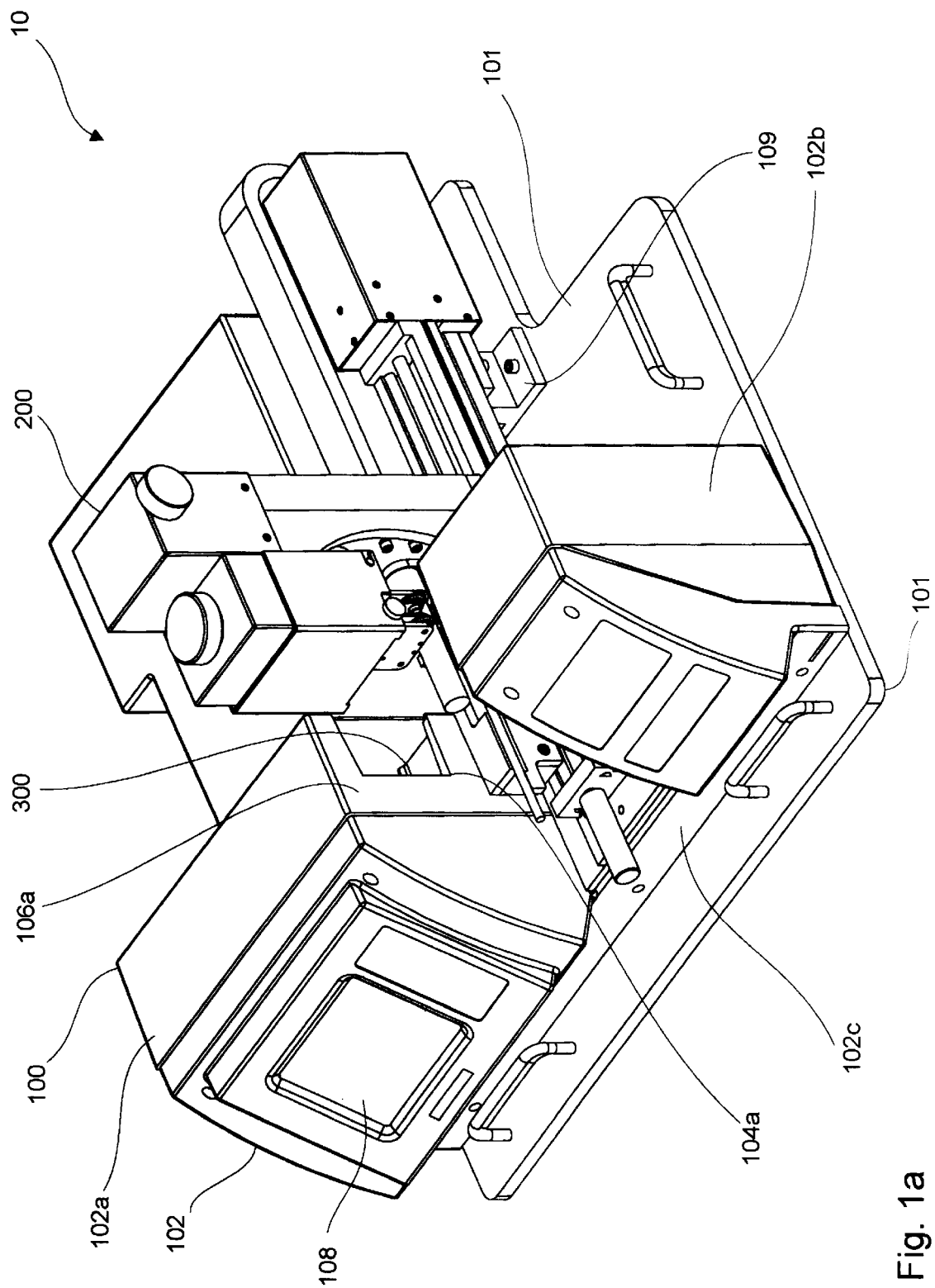
FIG. 1a a is a perspective view of the present invention.

Referring now to the drawings, the device of present invention is generally denoted by the numeral 10. The device 10 includes a laser micrometer 100 having a housing 102 including an emitting portion 102a and receiving portion 102b connected via a base portion 102c all of which is disposed on a support plate 101. A fixture 200 is operably connected to the base portion 102c between the portions 102a and 102b and support plate 101.

Figure 1B:
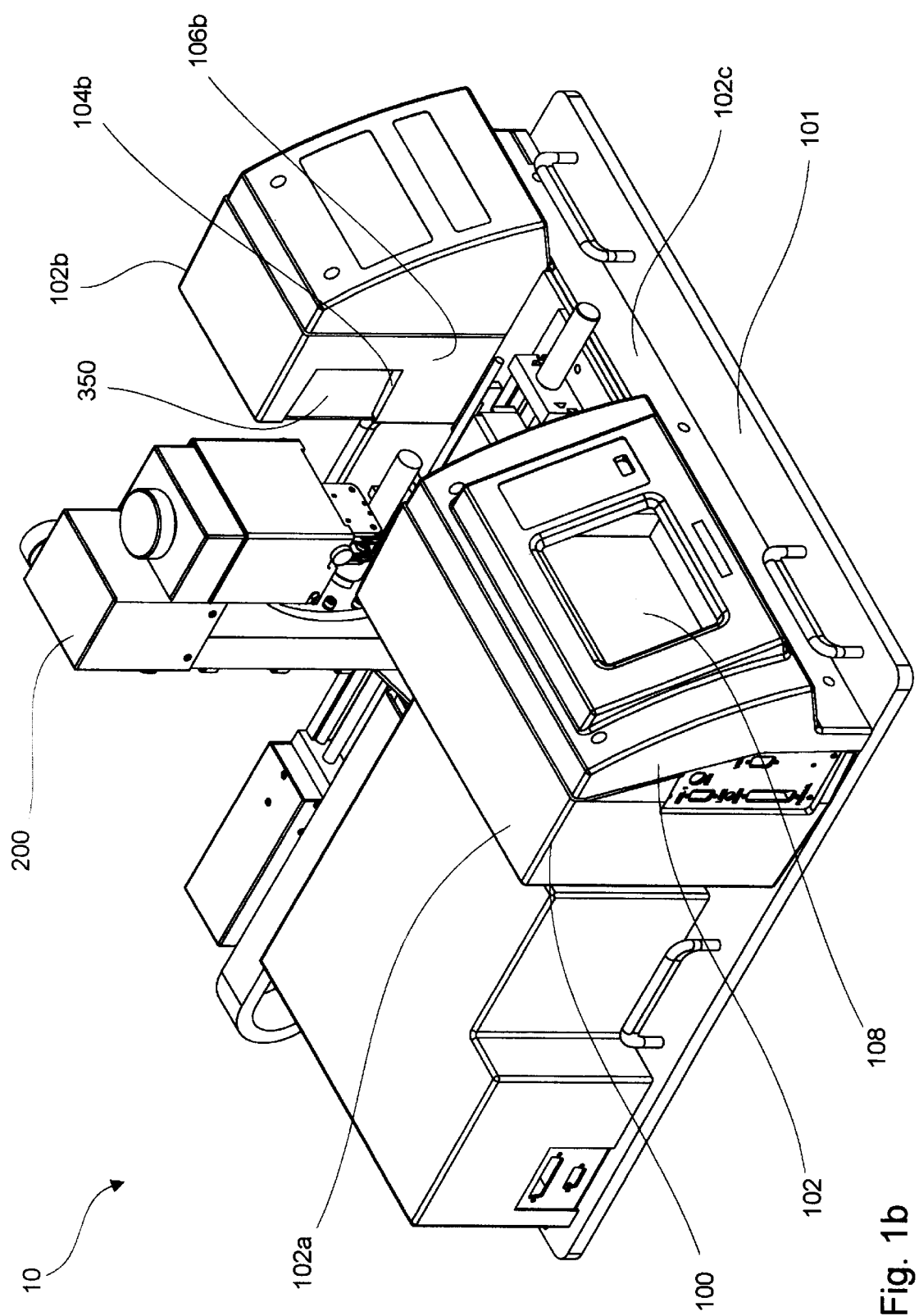
FIG. 1b is another perspective view of the present invention.

The emitting portion 102a includes an open surface 104a on a side 106a, as seen in FIG. 1a, through which a laser beam may pass. The emitting portion 102a includes a laser beam emitting device 300 operably disposed therein in a manner to emit a laser beam through the open surface 104a toward an open surface 104b of a side 106b of the receiving portion 102b which is received by a receiving device 350 as seen in FIG. 1b.

Figure 11:
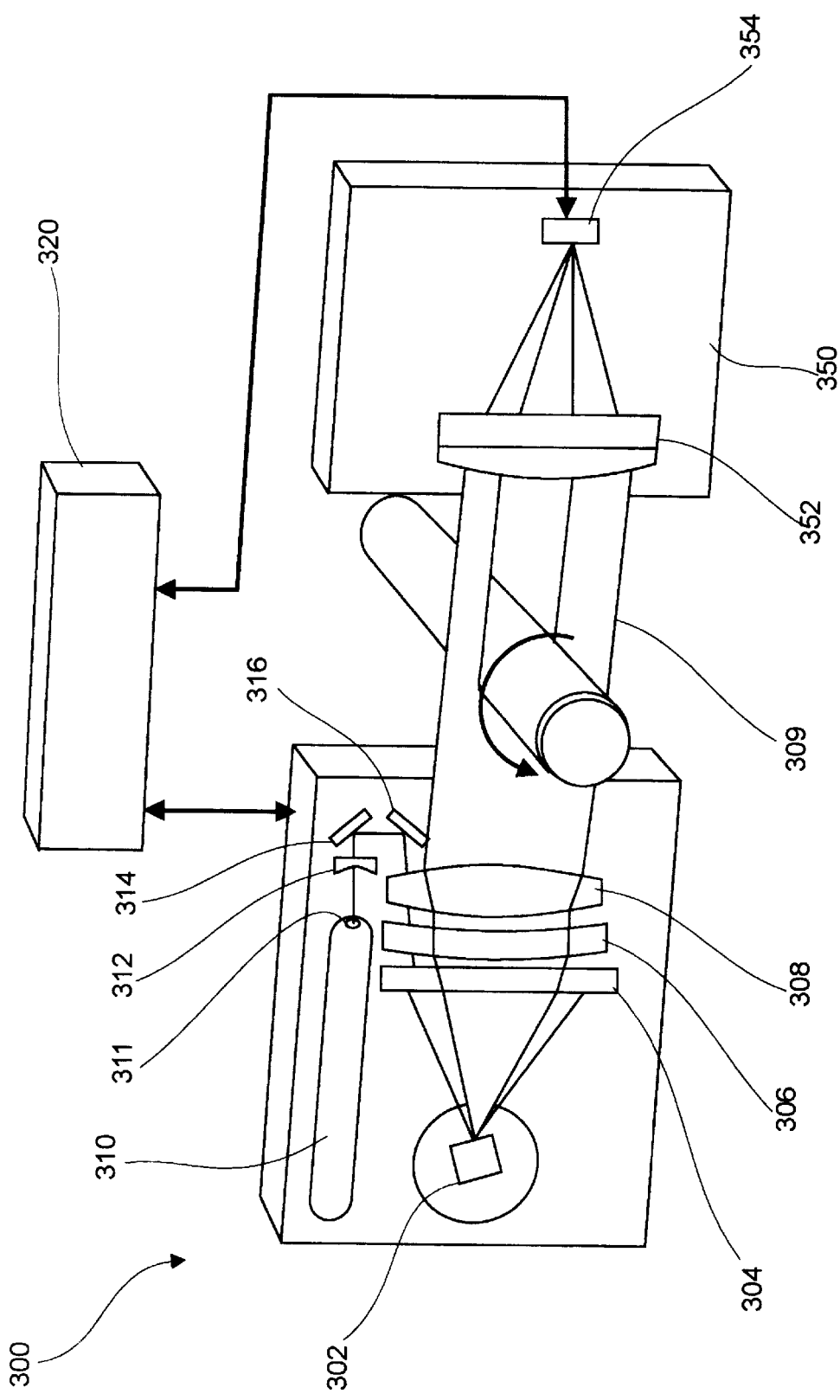
FIG. 11 depicts a schematic of a laser beam emitting device of the present invention.

As represented in FIG. 11, the laser beam device 300 includes a powerable rotatable scanner 302, edge sensing optics 304, collimator lens 306 and 308 through which a laser beam scan 309 passes prior to exiting through the open surface 104a. Also, included is powerable laser 310 which is preferably a low power HeNe Laser (other recognized lasers in the art may also be employed to carry out the invention), beam shaping optics 312, and fold mirrors 314 and 316. A processor 320 is also provided for controlling the operation of the laser beam device 310 and scanner 302 to produce the laser beam scan 309. The particular orientation of these components as shown are for purposes of illustration and not intended to be limiting in the invention. The laser beam scan 309 is formed by energizing the laser 310 to cause a laser beam 311 to be passed through the beam shaping optics 312, fold mirrors 314, 316, a peripheral edge of the lens 308, 306 and optics 304 to the scanner 302 whereat the beam 311 is transformed into laser beam scan 309.

A laser beam receiving device 350 is operably disposed within the portion 102b in a manner to receive the laser beam scan 309. The laser beam receiving device 350 includes a collector lens 352 for initially receiving the laser beam scan 309 as it enters through the open surface 104b. Photodiode and edge sensing preamplifier electronics 354 are operably disposed to receive the collected laser beam scan 309. The photodiode and edge sensing preamplifier electronics 354 are operably connected to the processor 320 to supply a signal feedback which when an object is disposed in the path of the scan 309 can be indicative of size of the object.

Figure 7:
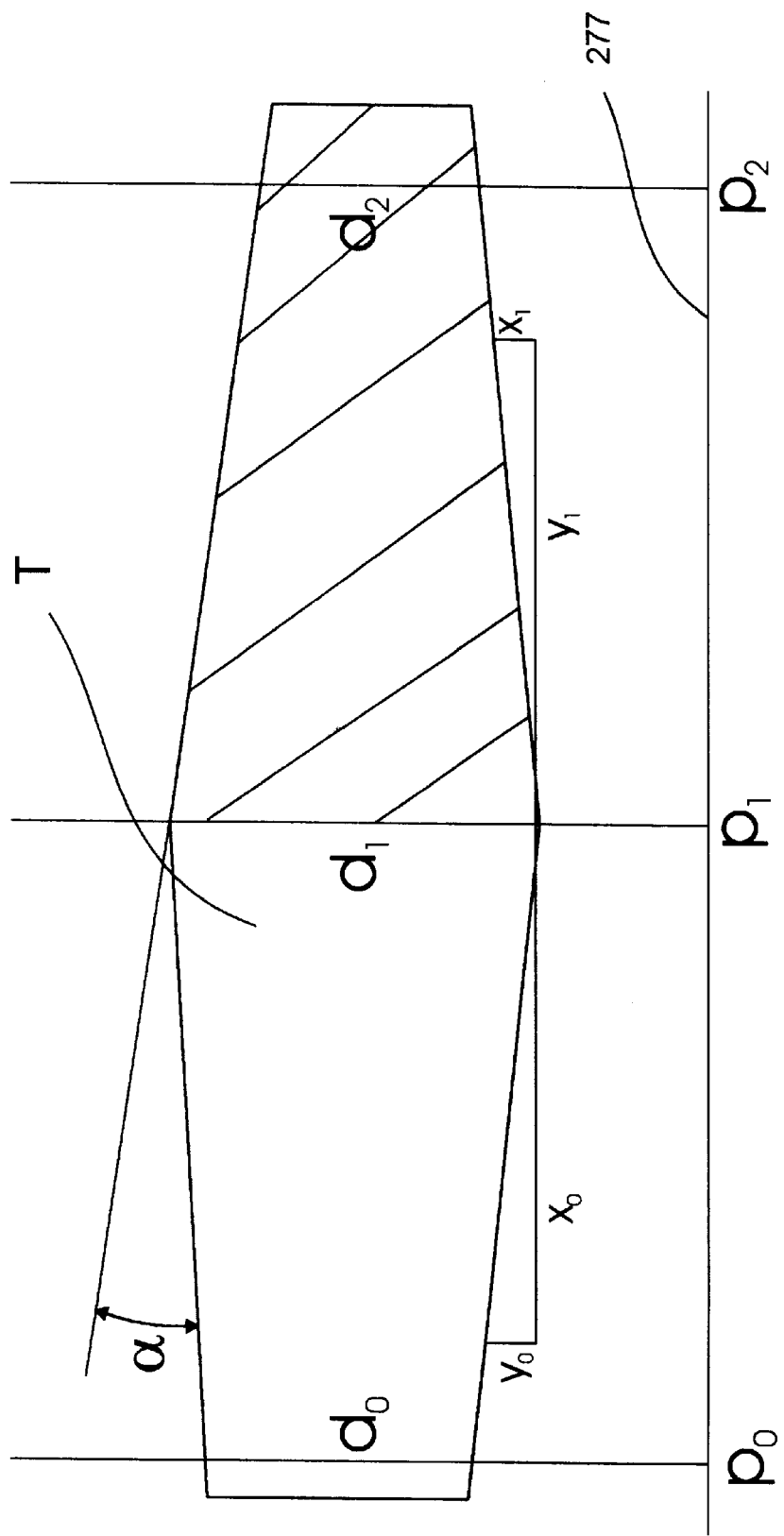
FIG. 7 depicts a measuring technique employed with the present invention.
Figure 8:
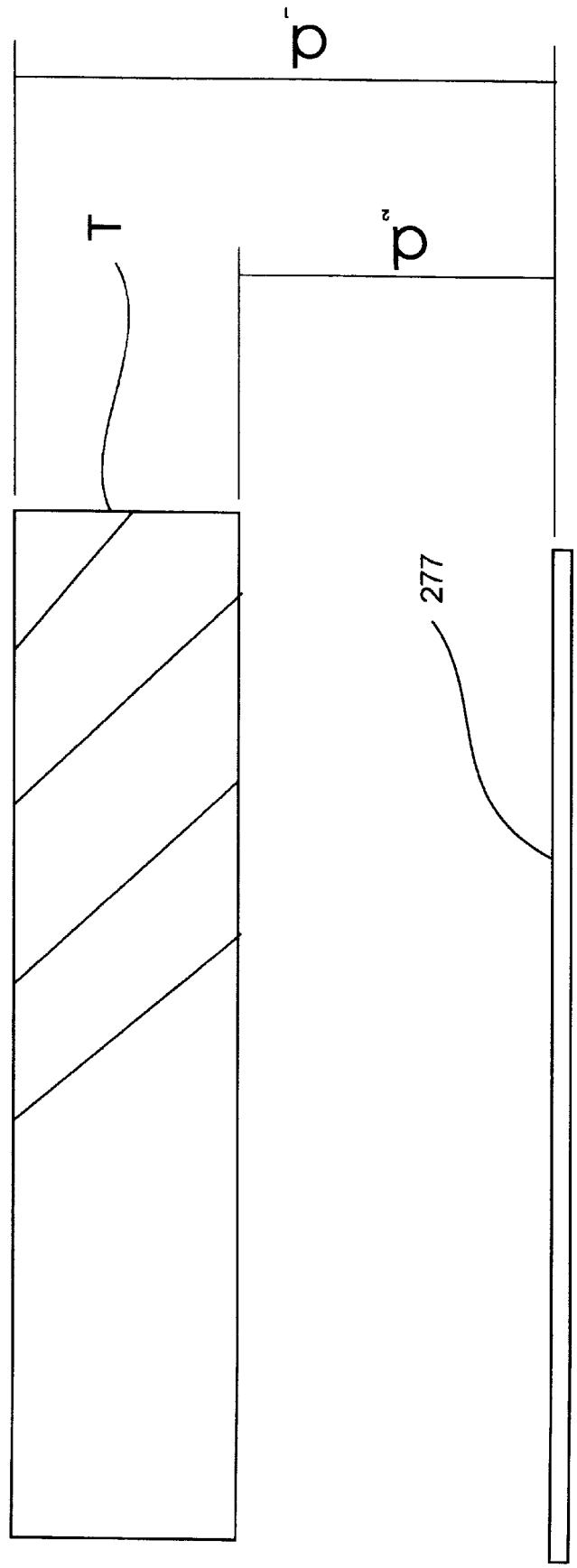
FIG. 8 depicts another measuring technique employed with the present invention.
Figure 9:
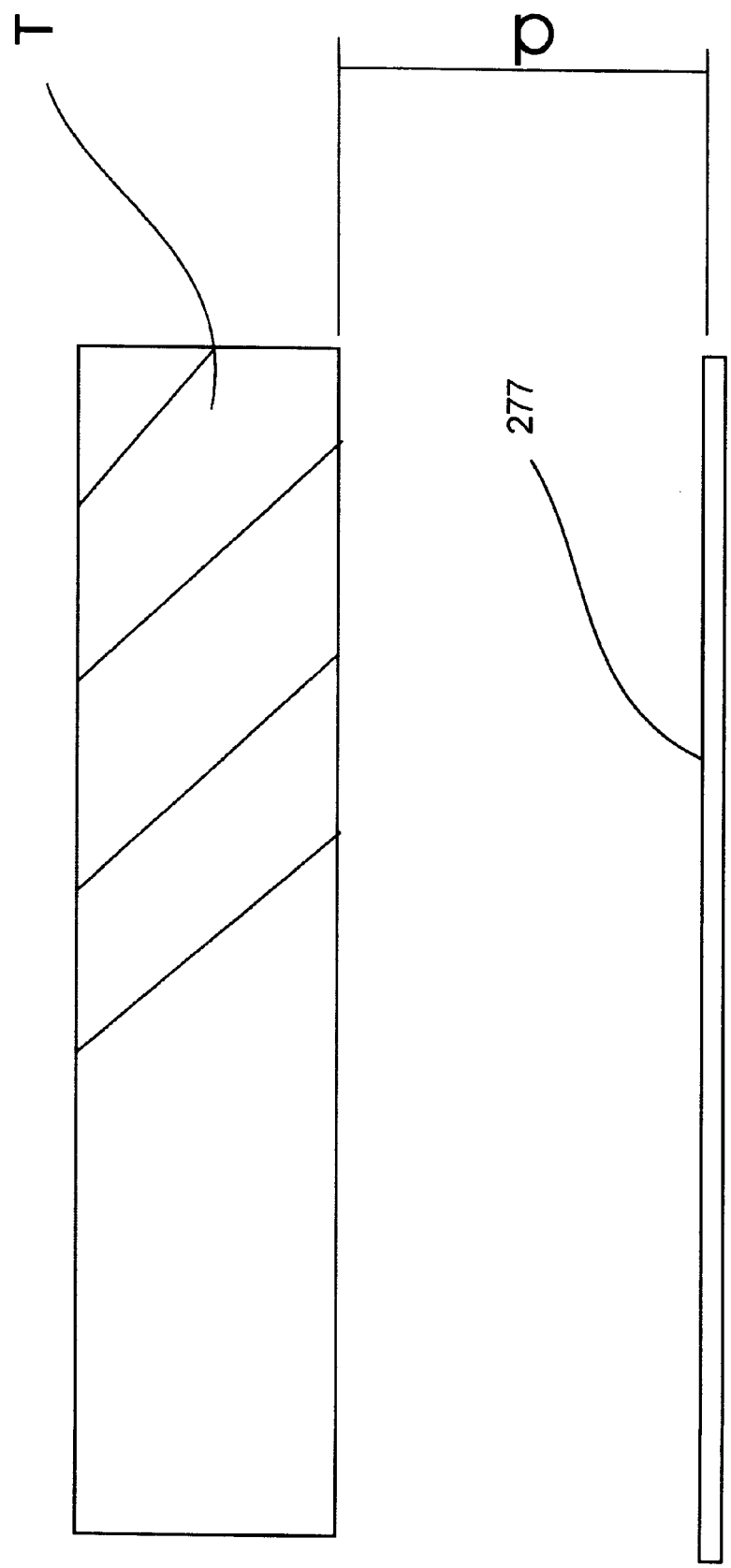
FIG. 9 depicts yet another measuring technique employed with the present invention.
Figure 10:
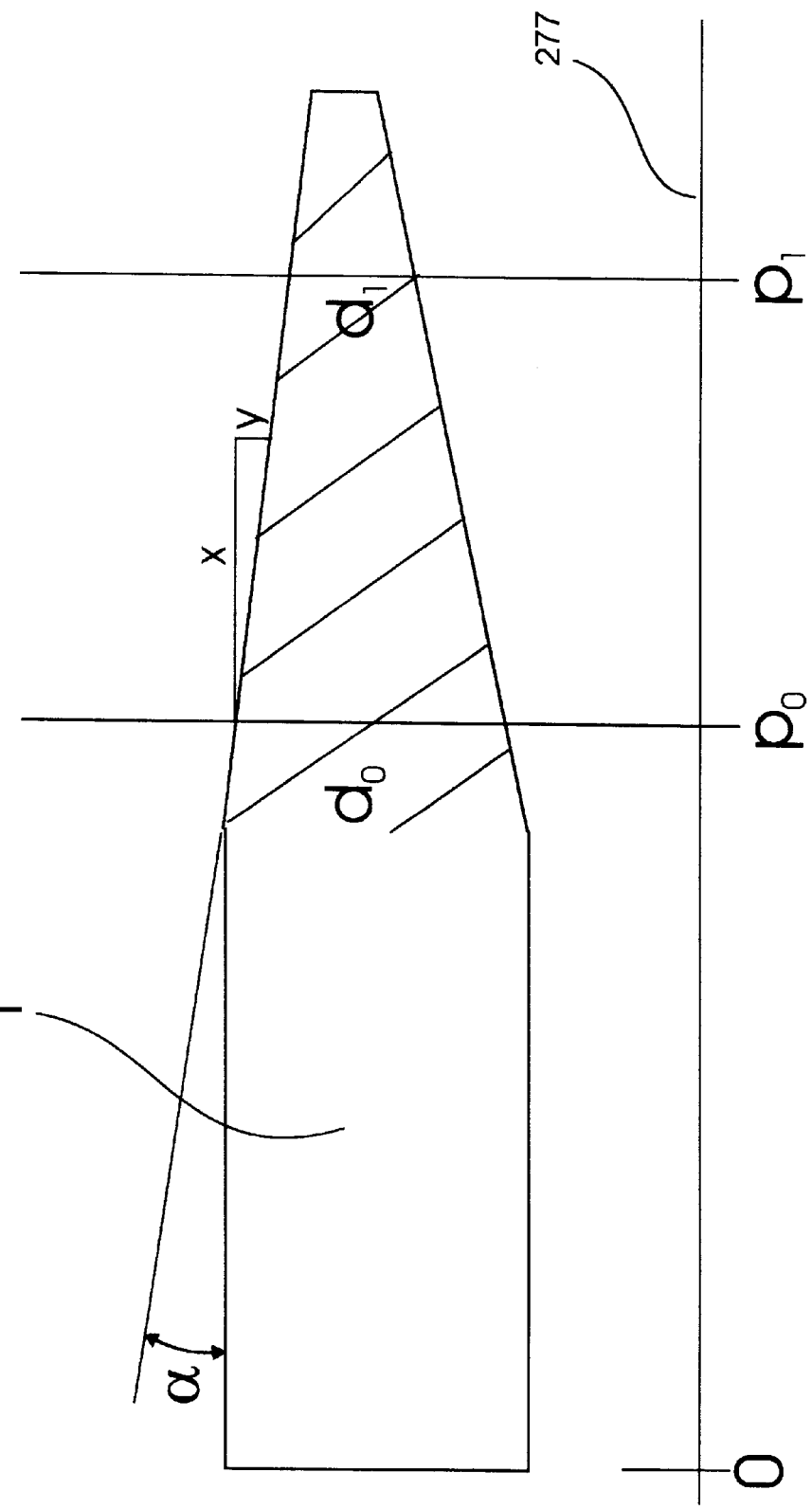
FIG. 10 depicts still another measuring technique employed with the present invention.

The processor 320 is operably associated with resident software code for performing various measuring functions such as measuring: bow and straightness-slope as represented in FIG. 7; effective cutting tool diameter as represented in FIG. 8; flute—flute variation as represented in FIG. 9; or effective taper as represented in FIG. 10. These representations are not intended to be limiting of the invention, but are exemplary in the potential functions of the invention. For FIG. 8, d$_1$ represents the distance from a top of a reference edge 277 to a top of a tool T and d$_2$ represents the distance from a top edge of the reference edge 277 to a bottom of the tool T. As the tool T is rotated, as will be apparent from the description herein, the resident software continues to recalculate d$_1$ and d$_2$ until a maximum d$_1$ and minimum d$_2$ are determined. Then the resident software calculates the difference between d$_1$ and d$_2$.

Similarly, FIG. 9 depicts the distance d from the top of a reference edge 277 to a bottom of the tool T which reflects the flute—flute variation in a drill bit. The resident software recalculates d as the tool T is rotated and a maximum d and minimum d determined. The resident software calculates the difference between these values as the flute—flute variation.

FIG. 10 depicts how effective taper is calculated. Here, the resident software calculates the effective cutting tool diameter at two different axial positions p$_0$ and p$_1$ to produce the effective cutting tool diameters d$_0$ and d$_1$. The taper or slope can also be calculated by the resident software using the following formula: taper=y/x=0.5(d$_1$−d$_0$)/(p$_1$−p$_0$); and the taper angle α=tan$^{-1}$(y/x).

FIG. 7 illustrates a further capability of the present invention by measuring bow and straightness. Here the effective cutting diameter is measured in three positions p$_0$, p$_1$, and p$_2$ along the tool T to produce measurements d$_0$, d$_1$, and d$_2$. The angle α between the cutting surfaces is obtained by the software as follows: y$_0$/x$_0$=0.5(d$_1$−d$_0$)/(p$_1$−p$_0$); y$_1$/x$_1$= 0.5(d$_2$−d$_1$)/(p$_2$−p$_1$); and the angle between the effective cutting surfaces α=tan$^{-1}$(y$_1$/x$_1$)−tan$^{-1}$(y$_0$/x$_0$).

The present invention enables accurate measurements such as these to be taken which were not heretofore readily obtainable. The present inventions capability to obtain such measurements is highly useful in that they provide critical information about the work piece, here described as the tool T.

Returning now to the description of the other components as seen the remaining drawings, a display screen 108 is operably disposed in the housing portion 102 to permit the user to visually read the measurements made by the device 10. The display screen 108 is preferably a touch sensitive display as is available in the art and is operably connected to the processor 320 to control the measurement operation of the device 10.

The processor 320 is preferably integrally disposed within the housing 100, but may be external of the housing 100 or associated with another processor to perform any of the functions described herein. The processor 320 includes an operating system, operably associated memory and the above described programmable software resident thereon for operating the device 10. Particularly, the processor 320 controls the device 10 in a manner to enable measurement of an object, such as the tool T, when disposed on the fixture 200 such that the object, tool T, is in the path of the laser scan 309 as seen in FIG. 11.

Figure 2:
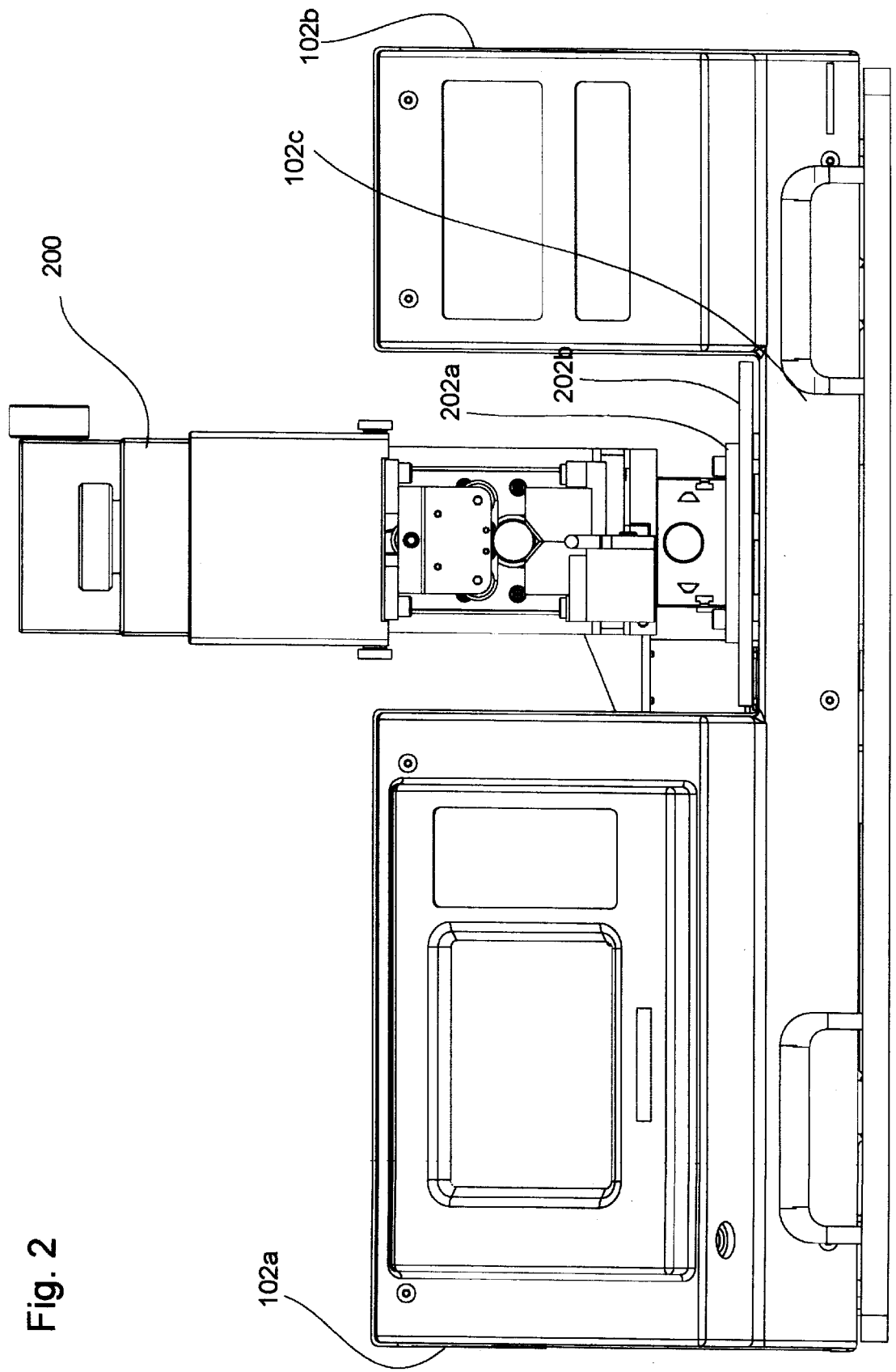
FIG. 2 is a side front view of the present invention.
Figure 4:
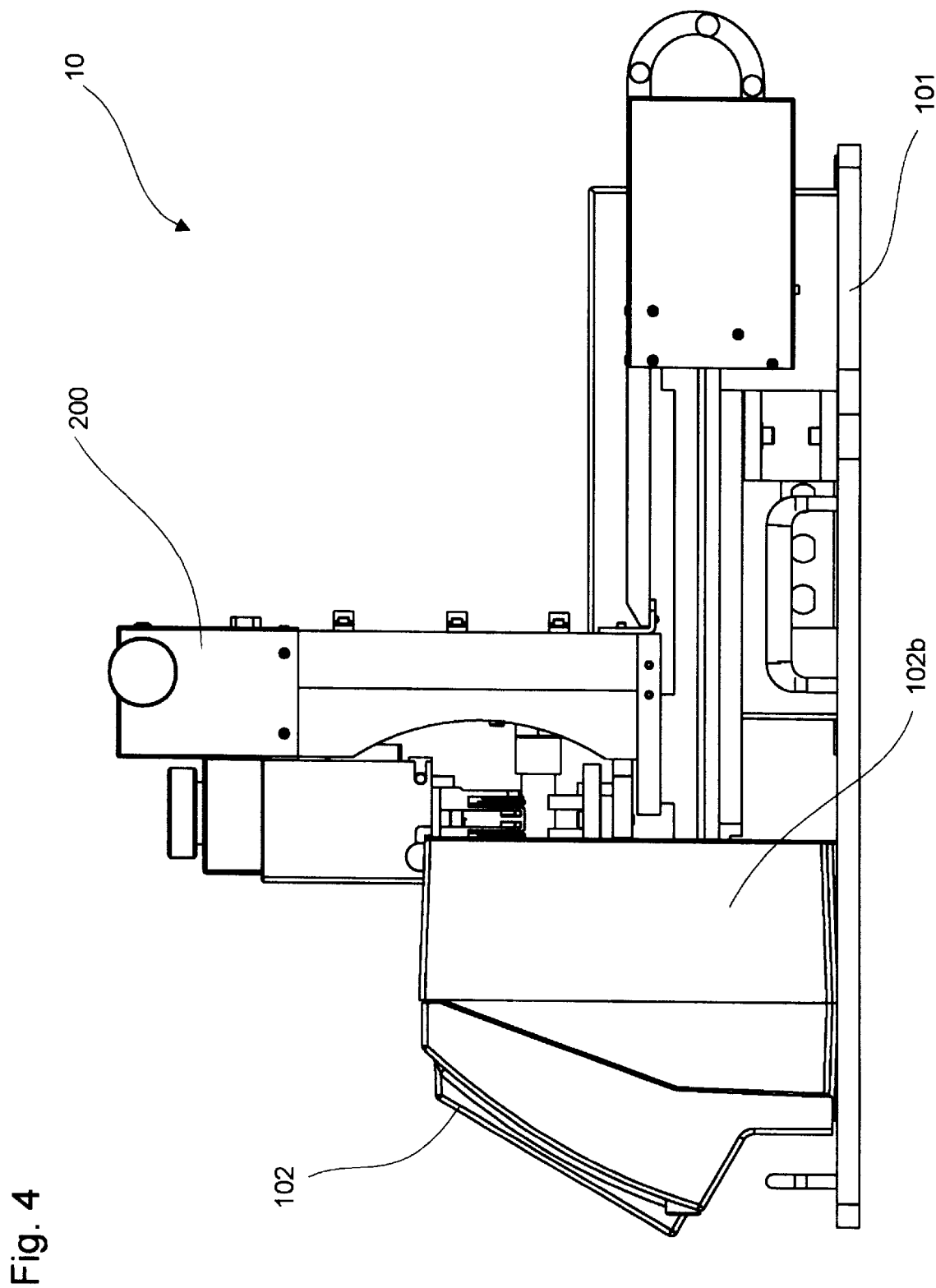
FIG. 4 is a left side view of the present invention.
Figure 4A:
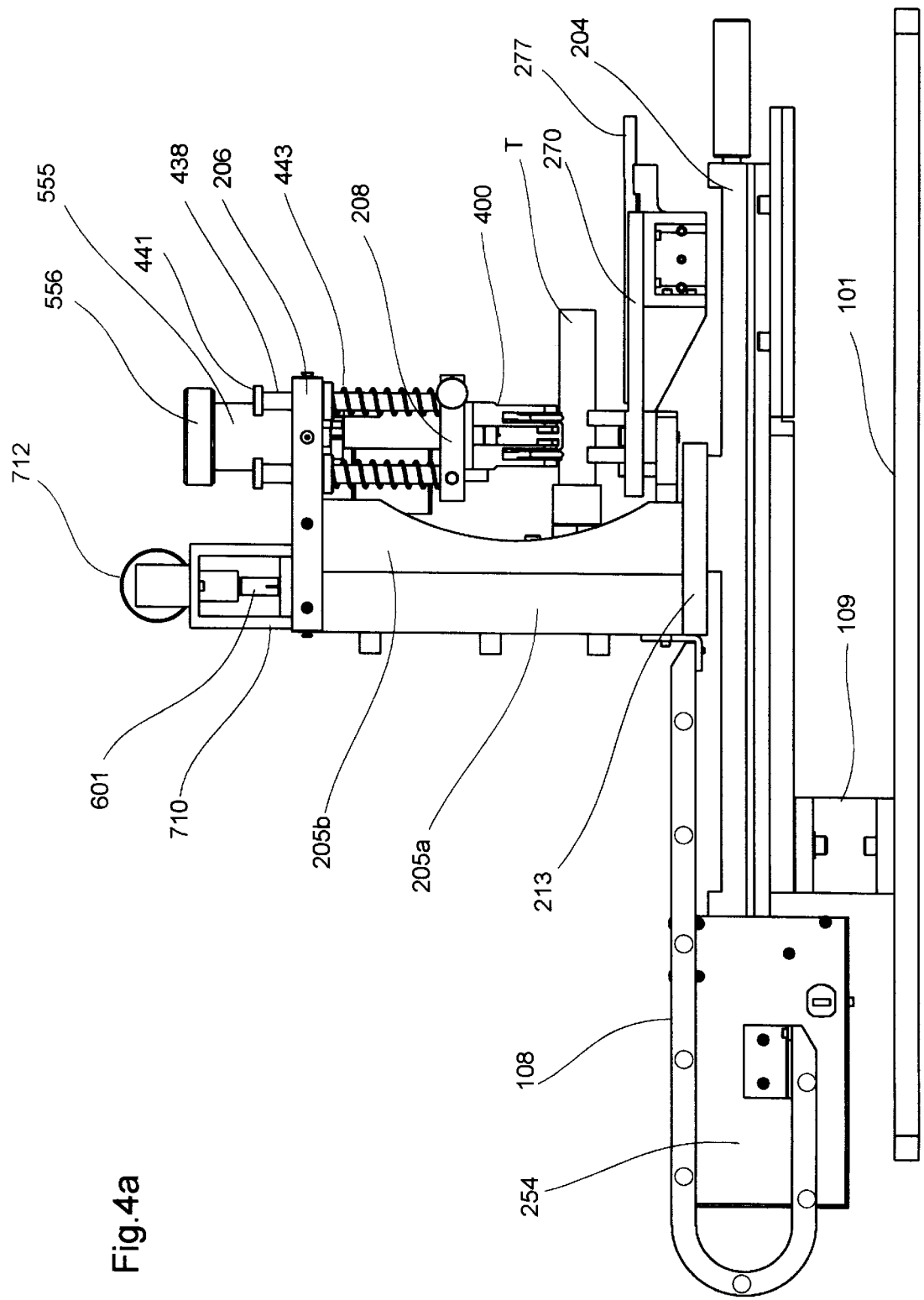
FIG. 4a is another side view of a fixture of the present invention.

Turning to FIGS. 5, 5a–5d, the fixture 200 is shown in an exploded form with the support plate 101. The fixture 200 includes a base plate which is removably connected to the base portion 102c (shown in FIG. 2, e.g.). The base plate includes two pieces 202a and 202b removably connectable via screws 105 being threaded through bored surfaces 207 to threaded open surfaces (not shown) in the piece 202b. It is contemplated that the base plate can be a single one piece unit.

A rear portion of the base plate piece 202a connects to a support 109 which in turn fixably connects to the support plate 101. The base plate piece 202a includes threaded surfaces 209 and support 109 includes bored surfaces 111. Screws 113 connect through bored surfaces 111 to threaded surfaces 209 to secure the piece 202a to the support 109. The support 109 also includes screws 115 which threadably connect through bored surfaces (not shown) in the support 109 to threaded surfaces (not shown) in support plate 101.

A linear slide rail 204 is removably connected to the base plate piece 202a via screws 211 extending through bored surfaces (not shown) in the slide rail 204 and which threadably connect to threaded surfaces 117 in the piece 202a. The linear slide rail 204 has a drive screw 203 which is threadably connected to a threaded nut (not shown) which is located within the square plate 204a shown attached in the center of the slide 204.

Operably connected to the drive screw 203 of the linear slide 204 is a linear motor 250 which is operably connected to processor 320. A housing 252 houses the linear motor 250 and connects to a rear of the linear slide 204. The linear motor 250 controls rotation of the drive screw 203 and the horizontal movement of a chassis 205 which is interconnected to the square plate 204a via a slide connection plate 213.

The slide support chassis 205 has an upper support plate 206 and a lower angle support plate 208 which are interconnected via the chassis 205. The chassis 205 further includes sub-parts 205a, 205b, 205c, 205d, 205e and 205f. 205a is a main vertical support and holds a vertical slide 205d in position. Gussets 205b supportively connect the upper plate 206 and lower plate 208 to minimize deflection. Cross plate 205c holds a nut 205g for the vertical lead screw 600. Vertical slide 205d enables the v-block assembly 210 to adjust up and down. An adjustment bracket 205e is enables connection of a magnetic end stop 260 and connects to a cross roller slide 205f which connect to slide plate 213.

The vertically movably connected lead screw 600 extends through an open surface 603 in the chassis piece 205c and open surface 602 of the upper support plate 206. The lead screw 600 has an end 601 which is connected to a gear box assembly 700. A bearing 605 is seated within a plate 607, wherein the bearing 605 connects to the lead screw 600.

The gear box assembly 700 includes a shaft connection plate 702, a subhousing 704 which operably retains the shaft connection plate 702, a gear shaft 706 operably connected to the subhousing 704 and shaft connection plate 702, a gear box 708 with gears (not shown) therein operably connected to gear shaft 706. Housing 710 is disposed about the recited parts and a knob 712 operably connects through the housing 710 to the gear box 708. The lead screw 600 connects to the gear shaft 706. The knob 712 operates the gear box 708 and in turn raising and lowering the lower angle support plate 208.

Mounted to the lower support plate 208 is a removable V-block assembly 210. FIGS. 5a and 5b best show the V-block assembly which includes a retaining plate 212 having a recessed surface 214 with bored surfaces 216 (four shown), and bored surfaces 218 (two shown) extending through the retaining plate 212. A V-shaped seat 220 is made up of two portions 220a and 220b having respective facing slanting side surfaces 222a and 222b, respectively, having their lower edges 224a and 224b, respectively meeting as seen in FIG. 5a with the portions 220a and 220b seated in the retaining plate 212. Within each surface 222a and 222b is a recessed surface 226a and 226b, respectively, to receive V-shaped bearings 228. The bearings 228 have an exposed arcuate surface when seated in the recessed surfaces 226a and 226b. The V-shaped bearings 228 are preferably made of a carbide material and are bonded into the recessed surfaces 226a and 226b. The V-shaped bearings 228 serve as the seat for the work object, e.g., tool T.

Screws 230 extend through the bored surfaces 216 and thread to threaded surfaces (not shown) in bottom surfaces (not shown) of portions 220a and 220b. The retaining plate 212 is secured to threaded bored surfaces (not shown) in the lower support plate 208 via screws 232.

The optional end stop 260 is connectable adjacent the V-block assembly 210. The end stop 260 can be magnetic to aid in holding metal work objects in the seat of the V-shaped bearings 228. Unnumbered parts in FIG. 5 are connector pieces which connect the parts described herein.

Referring now to FIGS. 5c and 5d, a removable drive assembly 400 is depicted. A support mount plate 402 is shown with bored surfaces 404 (four) and 406 (two). Screws 408 enable mounting of the mount plate 402 to threaded bored surfaces 410 and 412 of side pieces 414 and 416, respectively. The removable drive assembly 400 is removably connected to the intermediate support plate 207 via screws 409 passed through bored surfaces 406 and are threaded to threaded bored surfaces 449. Bored bearing surfaces 418 (three) and 420 (three) in side pieces 414 and 416, respectively, receive ends of axles 422. The axles 422 include wheels 424 connected thereon. One axle 422a includes an additional centrally connected drive wheel 426.

Flexible belts 428 are operatively disposed about the wheels 424. Additionally, there are provided roller tension bars 430 which seat in bored bearing surfaces 432 and 434 of the side pieces 414 and 416, respectively. Additional roller bars 431 which seat in bored bearing surfaces 433 and 435 of the side pieces 414 and 416, respectively, serve to provide a nip there between against which a cylindrical object, tool T, can be rotated by frictional moving engagement of the belts 428.

Figure 5:
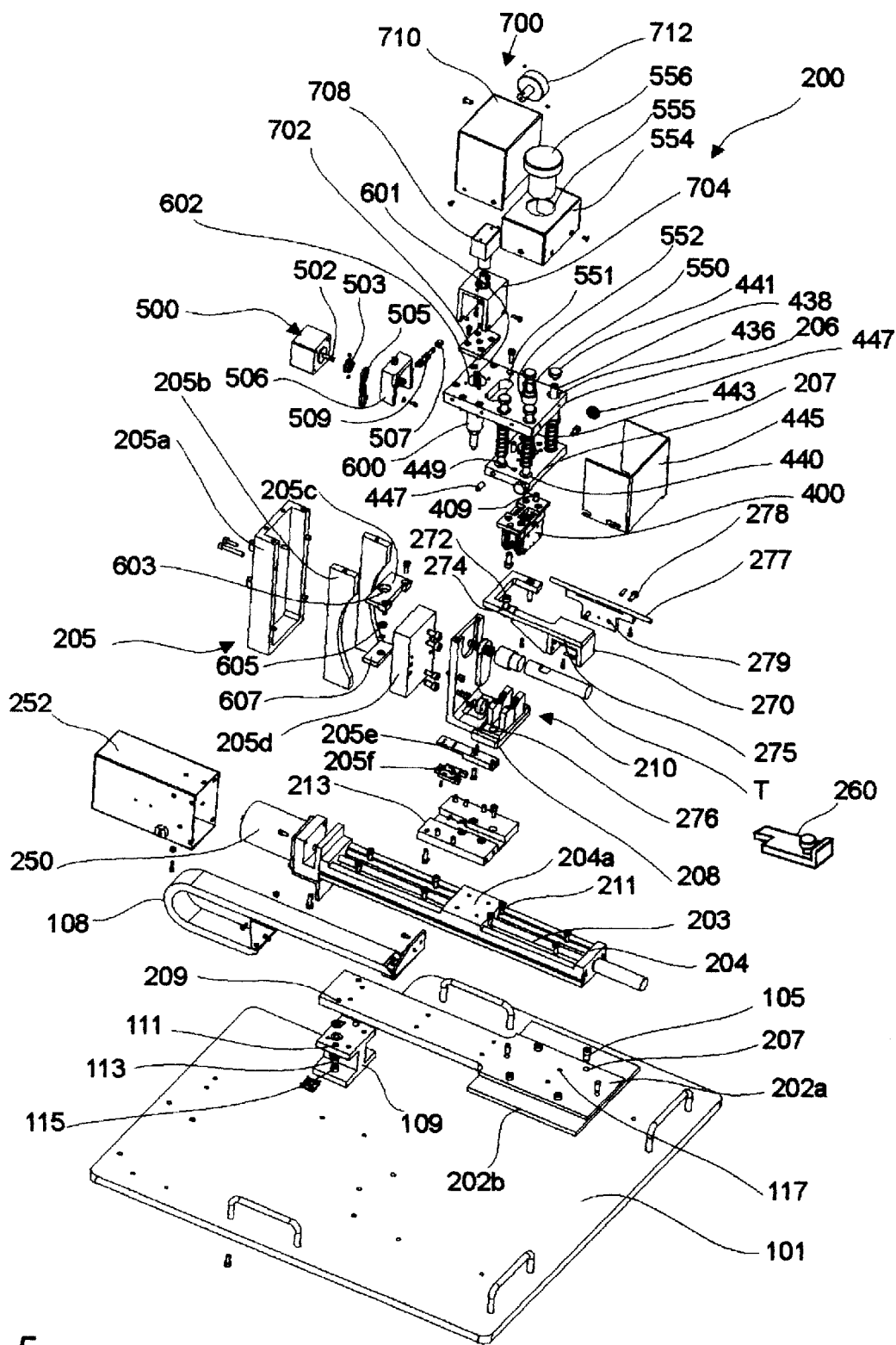
FIG. 5 is an exploded view of the fixture of the present invention.
Figures 5A, 5B:
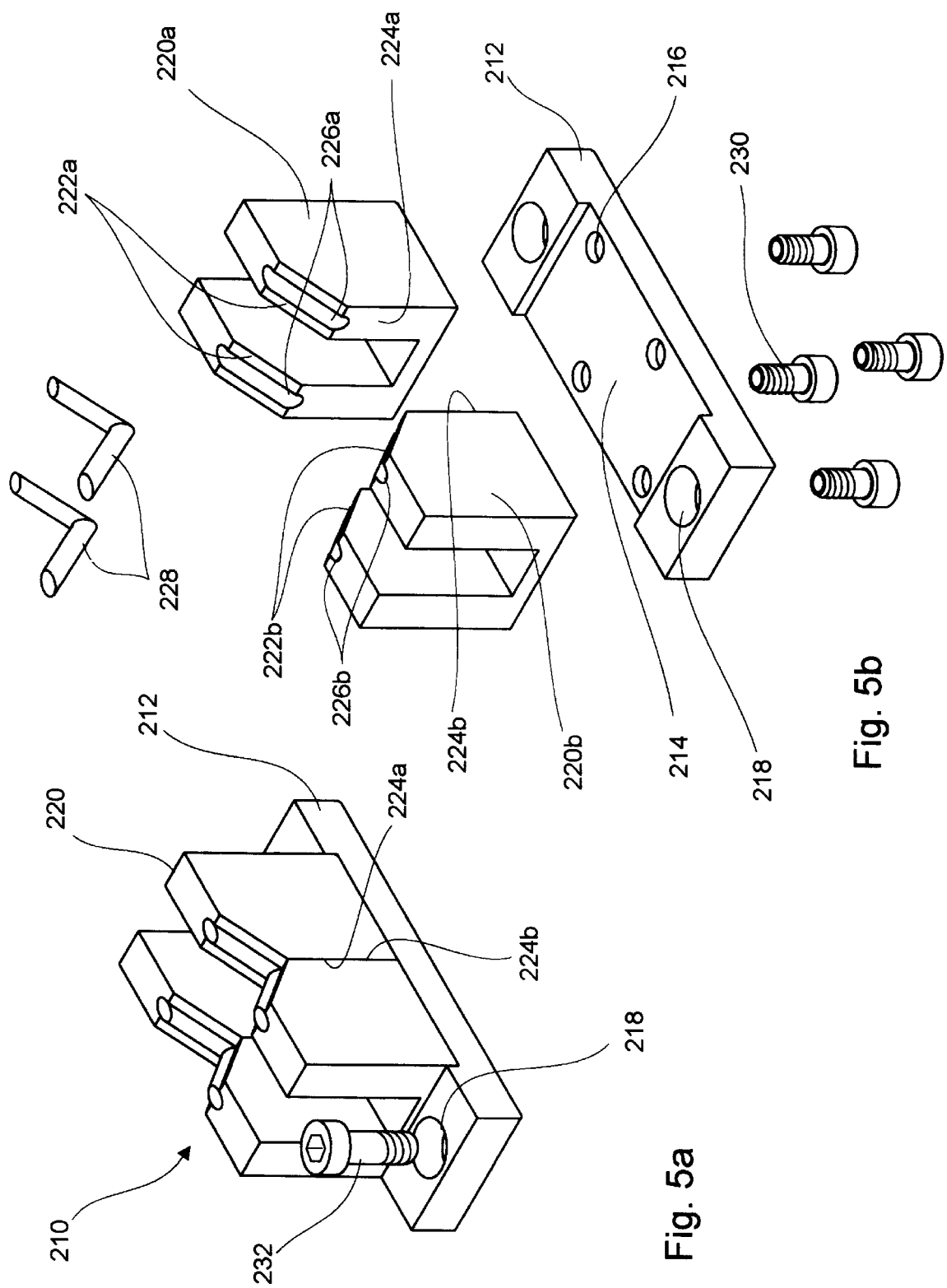
FIG. 5a is a perspective view of a V-block assembly of the present invention.
FIG. 5b is an exploded perspective view of the V-block assembly of the present invention.
Figure 6:
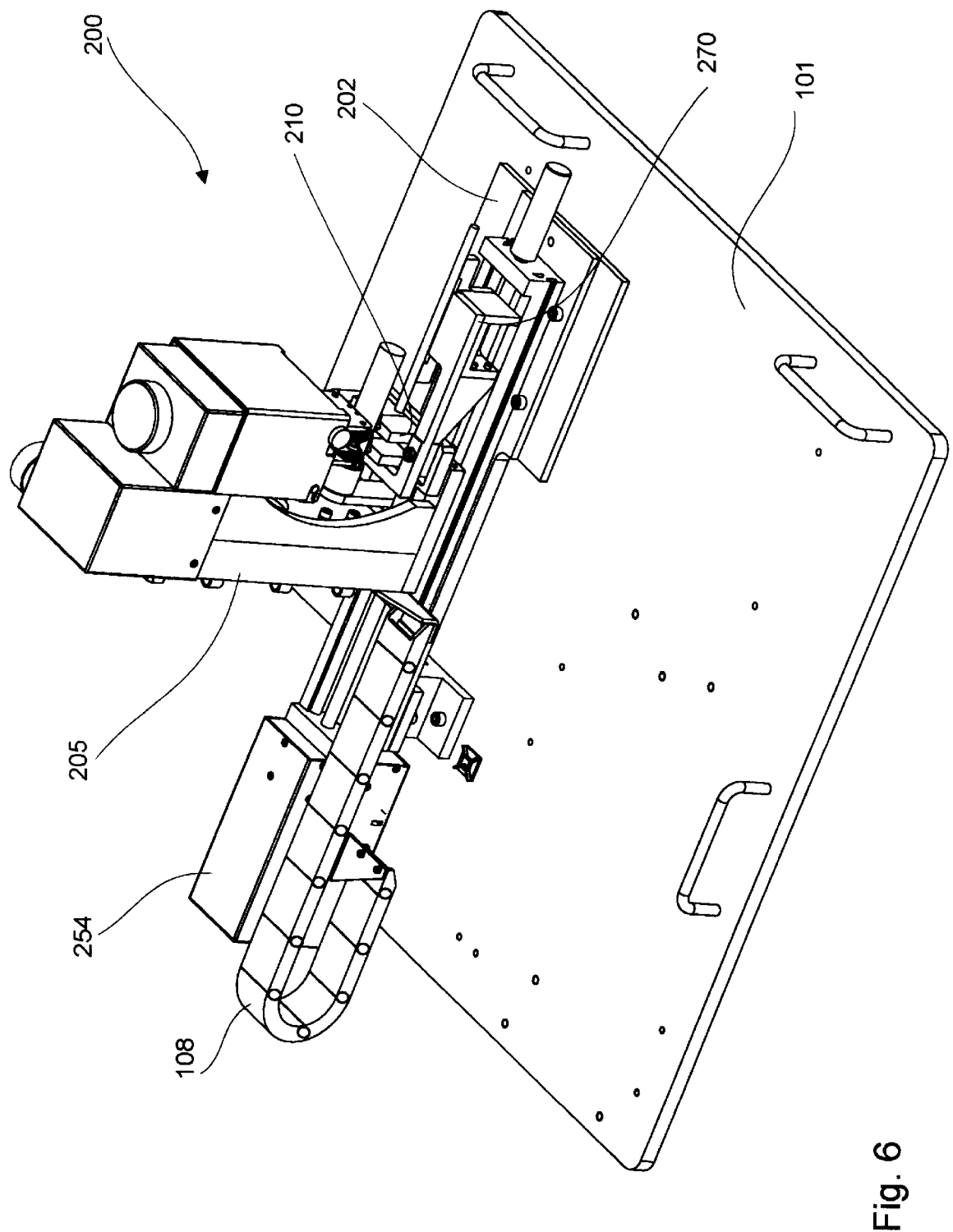
FIG. 6 depicts a perspective view of the fixture of the present invention.

As seen in FIG. 5, the upper support plate 206 includes four guide open bushing surfaces 436 which slidably receive guide pins 438 therethrough which extend toward and are fixed to an intermediate support plate 207 in bored surfaces 440. The guide pins 438 have one end fixed to intermediate support plate 207 and another end which extends through open bushing surface 436 and connect to screw-on heads 441 which prevent the guide pins 438 from sliding out of the bushing surfaces 436. Springs 443 are disposed about each of the guide pins 438 and bias against the upper support plate 206 and the intermediate support plate 207.

A vertical positioning screw 550 is operably movably disposed through an open surface 552 in the upper support plate 206 and fixably connects to the intermediate support plate 207 in a manner to enable vertical positioning of parts connected thereto. There is a lead screw nut (not shown) that is secured into the knob 556 and by turning the knob 556 the 550 lead screw is drawn up through the 206 plate. The 550 lead screw is attached to a bracket 506 which is attached to the intermediate support plate 207. Turning of the knob 556 enables the shaft 550 to move draw the intermediate support plate 207 to a vertical desired position.

A housing 445 removably slidably connects about pins 447 in the intermediate support plate 207 to cover the upper support plate 206, guide pins 438, springs 443, vertical positioning screw 550 and intermediate support plate 207. Another housing portion 554 removably connects to the upper support plate 206 to cover the heads 441, guide pins 438 and shaft 550. The housing 554 includes an open surface 555 through which a knob 556 extends and connects to the shaft 550.

The intermediate support plate 207 includes a slotted surface 451. A rotatable drive motor 500 is operably connected to an upper surface of the intermediate support plate 207 and includes a drive shaft 502 and operably connected drive wheel 503 which extends over the slotted surface 451. The central drive wheel 426 is disposed beneath the slotted surface 451. A drive belt 505 is operably disposed about the drive wheel 503 and drive wheel 426. The motor 500 is operably connected to the computer based processor 320 and a power source (not shown). Also, operably connected to the drive wheel 503 is a bearing 507 and shaft drive belt with roller 509.

A reference edge assembly 270 is threadably connected to the lower angle support plate 208 via screws 272 through bored surfaces 274 of an assembly mounting plate 275 to threaded surfaces 276 of the lower angle support plate 208. A reference edge bar 277 is threadably connected to the assembly mounting plate 275 via screws 278 through bored surfaces 279 thereof to threaded surfaces (not shown) of the assembly mounting plate 275.

When assembled, the fixture 200 enables the tool T to be held between the drive assembly 400 and V block assembly 210 in a slidably rotatable manner. As the drive belts 428 movingly contact the cylindrical tool T, the tool T naturally tends to creep out of its seat. However, the design of the V-shaped seat 428 in conjunction with the nip formed by the roller bars 431 maintain the tool T in its seat during turning of the tool T in order to obtain the measurements as described above. Additionally, the vertical adjustments aid in optimizing the rotatability as well slidability of the tool T.

The above described embodiment is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. a method of performing predetermined measuring functions of a work piece, which includes the steps of:
   (a) disposing a generally cylindrical work piece in a generally V-shaped seat such that said work piece contacts two sides of said V-shaped seat;
   (b) using means for applying sufficient force against said work piece to cause slidable rotation of said work piece in said V-shaped seat while said work piece is maintained in contact with said two sides while seated therein by said applying means;
   (c) disposing said generally cylindrical work piece in a path of a laser beam such that a first portion of said beam passes by a first part of said work piece; and
   (d) positioning a laser beam receiving processor to receive said first portion of said laser beam in order to determine a measuring function of said first part.

2. The method of claim 1, which further characterizes the step of (c) as disposing said work piece in said laser beam such that a second portion of said laser beam passes by another part of said work piece.

3. The method of claim 2, which further characterizes the step (d) to position said laser beam receiving processor to receive said second portion of said laser beam in order to enable a determination of size of said first part, wherein the size is determined as a function of distance between said first portion and said second portion of said laser beam.

4. The method of claim 1, which is further characterized as having a predetermined laser beam scan width and performing a plurality of size determinations as said work piece is rotated to determine maximum and minimum size of said first part.

5. The method of claim 1, further including disposing said work piece perpendicular to a path of said laser beam.

6. The method of claim 1, further including passing said laser beam axially across said work piece.

7. The method of claim 1, which further includes the steps of disposing said generally cylindrical work piece in a path of a laser beam such that a third portion of said beam passes by a third part of said work piece and positioning a laser beam-receiving processor to receive said third portion of said laser beam in order to determine a measuring function of said third part.

8. The method of claim 7, which further includes disposing said work-piece in said laser beam passes by another part of said work piece and positioning said laser beam receiving processor to receive said fourth position of said laser beam in order to determine a measuring function of said third part, wherein the measuring function is determined as a function of distance between said third portion and said fourth portion of said laser beam.

9. The method of claim 1 wherein said measuring function of said first part is the size of said first part.

10. a fixture for use with a laser micrometer, which includes:
    a V-shaped seat comprising a first portion having a first slanting side surface and a second portion having a second slanting side surface, wherein a lower edge of said first slanting side surface and a lower edge of said second slanting side surface meet to form said V-shaped seat to receive a generally cylindrical work piece; and
    apparatus for rotating said work piece to cause slidable rotation of said work piece in said V-shaped seat such that said work piece is maintained in contact with said two sides while seated therein by said apparatus.

11. The V-shaped seat of claim 10, wherein each of said first slanting side surface and said second slanting side surface includes a recessed surface configured to receive a bearing.

12. The V-shaped seat of claim 11, wherein said bearing has an exposed arcuate surface when seated in the recessed surface.

13. A laser micrometer for measuring a work piece, which includes:
    means for generating a laser beam path such that a portion of said beam path passes by a part of the work piece;
    means for receiving and processing said portion of said beam path to determine size of said first part;
    a V-shaped seat having a first side surface and a second side surface, wherein said surface form a seat to receive the work piece, and wherein the V-shaped seat seats the work piece to permit at least a portion of the work piece to be disposed within said beam path; and
    apparatus for rotating said work piece to cause slidable rotation of said work piece in said V-shaped seat such that said work piece is maintained in contact with said two sides while seated therein by said apparatus.

14. The laser micrometer of claim 13, wherein the work piece is positionable in said beam path such that a portion of said beam passes by two sides of the work piece and said receiving and processing means is further characterized to receive said portions of said laser beam in order to enable a determination of size of said first part, wherein the size is determined as a function of distance between said portions of said laser beam.

15. The laser micrometer of claim 13, which is further characterized as having a predetermined laser beam scan width and means for performing a plurality of size deter minations as said work piece is rotated to determine maximum and minimum size of said first part.

16. The laser micrometer of claim 13, which further includes means for movably positioning said V-shaped seat wherein the work piece is selectively disposed in a predetermined position of the laser beam.

17. The laser micrometer of claim 16, wherein the work piece is held perpendicular to a path of said laser beam.

18. The laser micrometer of claim 16, wherein said laser beam is axially positioned across said work piece.

* * * * *